United States Patent
Chunawala et al.

(10) Patent No.: US 9,675,098 B2
(45) Date of Patent: Jun. 13, 2017

(54) DOUBLE FORTIFIED SALT COMPOSITION CONTAINING IRON AND IODINE AND PROCESS FOR THE PREPARATION THEREOF

(71) Applicant: Council of Scientific & Industrial Research, New Delhi (IN)

(72) Inventors: Jatin Rameshchandra Chunawala, Bhavnagar (IN); Pushpito Kumar Ghosh, Bhavnagar (IN); Maheshkumar Ramniklal Gandhi, Bhavnagar (IN); Satish Hariray Mehta, Bhavnagar (IN); Mrunalben Vinodray Sheth, Bhavnagar (IN); Dibyendu Mondal, Bhavnagar (IN)

(73) Assignee: Council of Scientific & Industrial Research (IN)

( * ) Notice: Subject to any disclaimer, the term of this patent is extended or adjusted under 35 U.S.C. 154(b) by 9 days.

(21) Appl. No.: 14/382,521

(22) PCT Filed: Mar. 4, 2013

(86) PCT No.: PCT/IN2013/000124
§ 371 (c)(1),
(2) Date: Sep. 2, 2014

(87) PCT Pub. No.: WO2013/128474
PCT Pub. Date: Sep. 6, 2013

(65) Prior Publication Data
US 2015/0037466 A1    Feb. 5, 2015

(30) Foreign Application Priority Data

Mar. 2, 2012 (IN) ............... 607/DEL/212

(51) Int. Cl.
| | |
|---|---|
| A23L 1/00 | (2006.01) |
| A23L 1/304 | (2006.01) |
| C01G 49/00 | (2006.01) |
| A23L 27/40 | (2016.01) |
| A23L 33/16 | (2016.01) |

(52) U.S. Cl.
CPC ............. *A23L 1/304* (2013.01); *A23L 27/40* (2016.08); *A23L 33/16* (2016.08); *C01G 49/009* (2013.01); *A23V 2002/00* (2013.01); *C01P 2002/72* (2013.01); *C01P 2006/42* (2013.01)

(58) Field of Classification Search
CPC ........ A23L 1/237; A23L 1/304; C01G 49/009
USPC ................................ 423/420.2; 426/74, 649
See application file for complete search history.

(56) References Cited

U.S. PATENT DOCUMENTS

| | | |
|---|---|---|
| 4,629,626 A | 12/1986 | Miyata et al. |
| 5,114,898 A | 5/1992 | Pinnavaia et al. |
| 6,998,143 B1 | 2/2006 | Sher et al. |
| 7,695,707 B2 | 4/2010 | Ghosh et al. |
| 2009/0188810 A1 | 7/2009 | Ghosh et al. |
| 2010/0203152 A1 | 8/2010 | Newton et al. |

FOREIGN PATENT DOCUMENTS

| | | |
|---|---|---|
| EP | 0061175 A1 | 9/1982 |
| WO | WO-2009074998 A2 | 6/2009 |
| WO | WO-2011015859 A1 | 2/2011 |
| ZA | 200004598 A | 3/2002 |

OTHER PUBLICATIONS

Velu, et al., "Effect of substitution of . . . calcined hydrotalcite" Applied Catalysis A: General 162 (1997) pp. 81-91.*

* cited by examiner

*Primary Examiner* — Steven Bos

(57) ABSTRACT

The present invention relates to stable and white iron fortification and iron+iodine double fortification agents, their preparation and use in fortification of salt. These agents help overcome the normal difficulties encountered in iron and iodine fortification such as low iodine stability on storage, development of colour and odour, and use of unwanted additives to impart stability. In one of the invented products, both iron and iodine coexist in stable manner in the same matrix which allow for a more uniform distribution of iodine. The process of preparation is demonstrated to be scalable and utilizes commonly available raw materials which would enable the products to be synthesized in affordable manner.

12 Claims, 8 Drawing Sheets

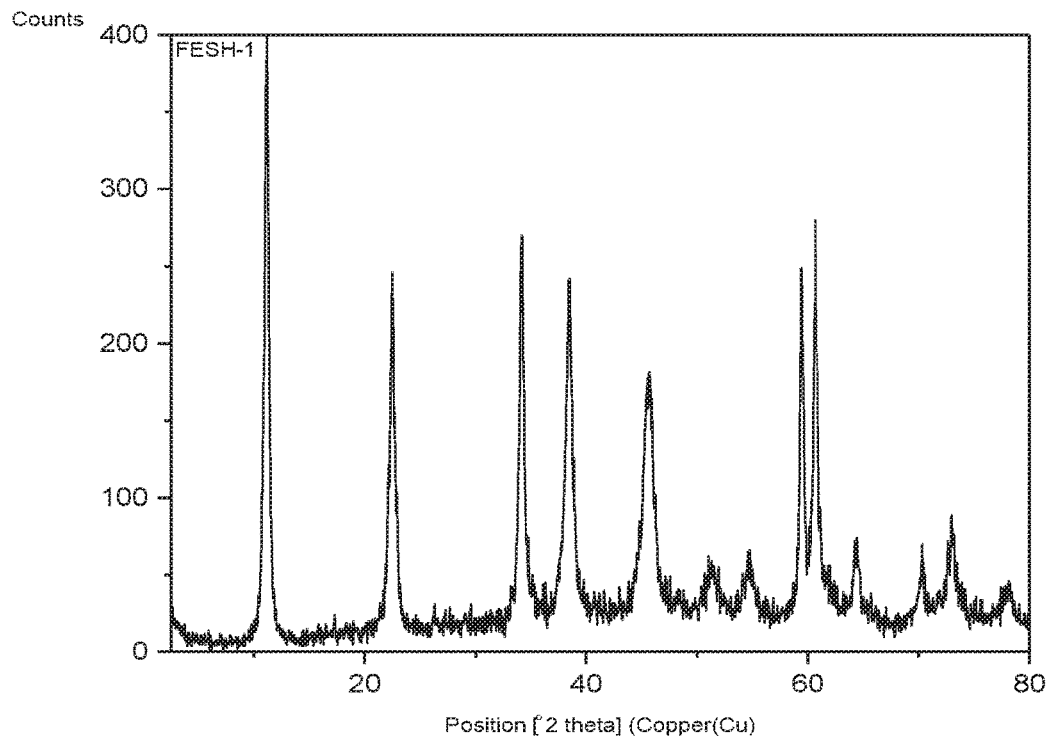
Peak List
| d-spacing [Å] | Rel.Int. [%] | Pos. [°2Th.] | Height [cps] | FWHM [°2Th.] |
|---|---|---|---|---|
| 38.99023 | 3.72 | 2.2659 | 14.41 | 0.4920 |
| 7.92736 | 100.00 | 11.1617 | 387.78 | 0.3936 |
| 3.95583 | 59.07 | 22.4761 | 229.07 | 0.1968 |
| 2.62834 | 62.14 | 34.1133 | 240.96 | 0.2952 |
| 2.34193 | 53.87 | 38.4390 | 208.88 | 0.2460 |
| 1.98187 | 33.07 | 45.7839 | 128.23 | 0.6888 |
| 1.77737 | 6.91 | 51.4118 | 26.79 | 0.4920 |
| 1.67937 | 8.63 | 54.6534 | 33.48 | 0.3936 |
| 1.55643 | 56.72 | 59.3824 | 219.95 | 0.2952 |
| 1.52674 | 60.06 | 60.6567 | 232.89 | 0.2952 |
| 1.44793 | 9.50 | 64.3408 | 36.86 | 0.4920 |
| 1.33829 | 10.05 | 70.3479 | 38.99 | 0.3936 |
| 1.29481 | 14.06 | 73.0834 | 54.52 | 0.6888 |
| 1.22285 | 4.85 | 78.0883 | 18.81 | 0.9600 |
Fig: 1

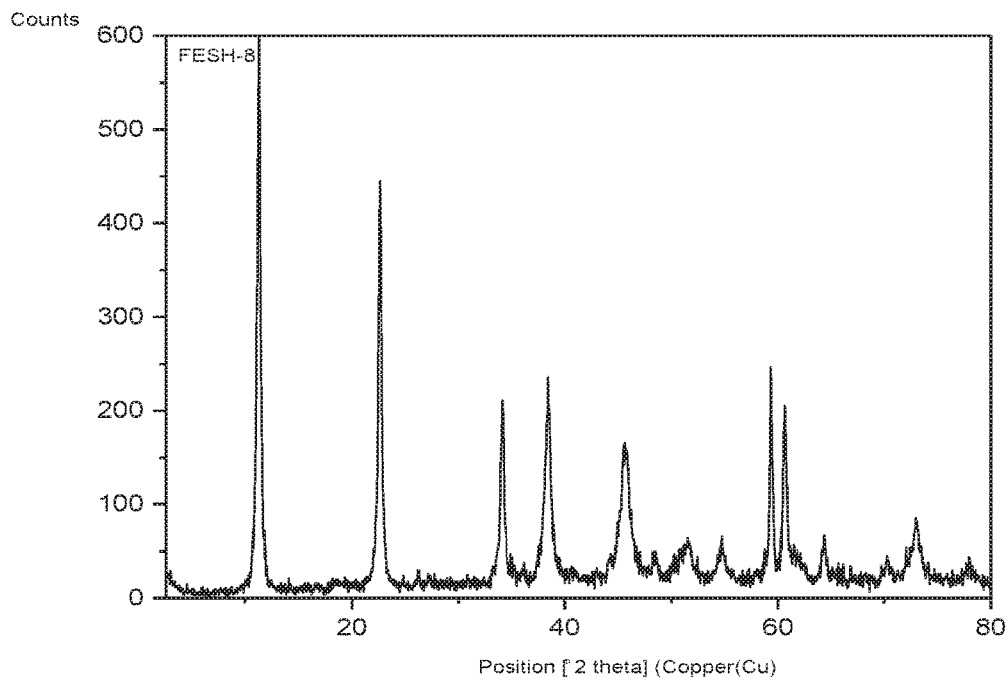
Peak List
| d-spacing [Å] | Rel.Int. [%] | Pos. [°2Th.] | Height [cps] | FWHM [°2Th.] |
|---|---|---|---|---|
| 7.84529 | 100.00 | 11.2788 | 592.38 | 0.2952 |
| 3.92854 | 72.20 | 22.6343 | 427.68 | 0.2460 |
| 3.39904 | 2.91 | 26.2187 | 17.22 | 0.2952 |
| 2.62633 | 31.39 | 34.1402 | 185.96 | 0.2952 |
| 2.34084 | 32.20 | 38.4577 | 190.77 | 0.2952 |
| 1.99069 | 22.35 | 45.5697 | 132.38 | 0.5904 |
| 1.88000 | 3.69 | 48.4189 | 21.84 | 0.3936 |
| 1.76915 | 5.69 | 51.6684 | 33.70 | 0.4920 |
| 1.67655 | 6.31 | 54.7529 | 37.40 | 0.5904 |
| 1.55849 | 31.37 | 59.2959 | 185.83 | 0.2460 |
| 1.52824 | 26.98 | 60.5911 | 159.81 | 0.2460 |
| 1.44765 | 6.14 | 64.3550 | 36.37 | 0.2952 |
| 1.33942 | 3.35 | 70.2799 | 19.87 | 0.7872 |
| 1.29582 | 9.98 | 73.0167 | 59.14 | 0.3936 |
| 1.22532 | 2.71 | 77.9010 | 16.06 | 0.9600 |
Fig: 2

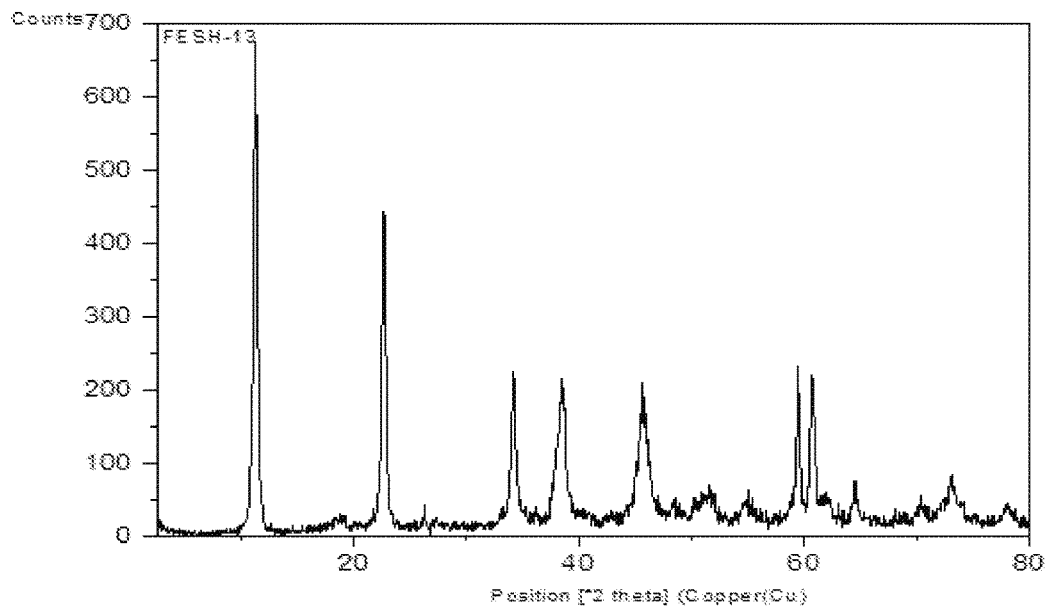
Peak List
| d-spacing[Å] | Rel.Int.[%] | Pos.[°2Th.] | Height[cps] | FWHM[°2Th.] |
|---|---|---|---|---|
| 7.83819 | 100.00 | 11.2891 | 665.17 | 0.2952 |
| 3.92148 | 64.13 | 22.6756 | 426.60 | 0.3444 |
| 3.39563 | 3.23 | 26.2455 | 21.52 | 0.2952 |
| 2.62701 | 30.37 | 34.1311 | 202.04 | 0.2952 |
| 2.33416 | 24.52 | 38.5722 | 163.09 | 0.4920 |
| 1.98841 | 21.75 | 45.6249 | 144.66 | 0.4920 |
| 1.76123 | 3.22 | 51.9180 | 21.40 | 0.6888 |
| 1.67387 | 3.70 | 54.8481 | 24.60 | 0.5904 |
| 1.55441 | 26.50 | 59.4672 | 176.25 | 0.2460 |
| 1.52499 | 25.35 | 60.7340 | 168.63 | 0.3444 |
| 1.49159 | 3.72 | 62.2431 | 24.75 | 0.5904 |
| 1.44556 | 4.67 | 64.4592 | 31.04 | 0.4920 |
| 1.33885 | 2.60 | 70.3140 | 17.28 | 0.5904 |
| 1.29592 | 7.77 | 73.0103 | 51.70 | 0.3936 |
| 1.22439 | 2.90 | 77.9717 | 19.30 | 0.8400 |
Fig: 3

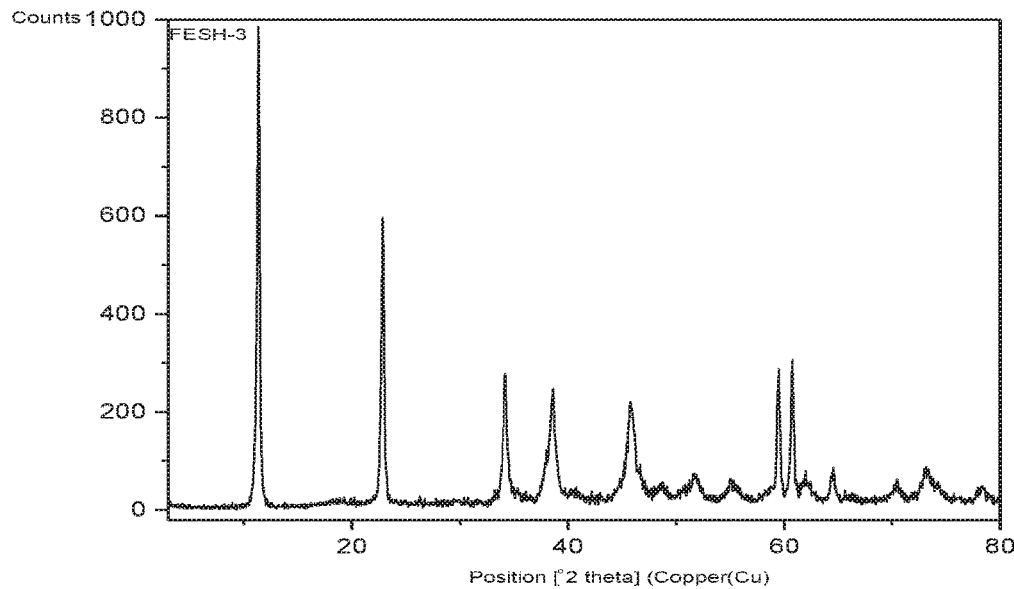
Peak List
| d-spacing[Å] | Rel.Int.[%] | Pos.[°2Th.] | Height[cps] | FWHM[°2Th.] |
|---|---|---|---|---|
| 7.77562 | 100.00 | 11.3802 | 977.22 | 0.1968 |
| 3.89169 | 59.69 | 22.8516 | 583.30 | 0.2460 |
| 2.62411 | 25.79 | 34.1700 | 252.00 | 0.2952 |
| 2.33064 | 22.66 | 38.6327 | 221.48 | 0.3936 |
| 2.22129 | 1.35 | 40.6160 | 13.20 | 0.5904 |
| 1.98017 | 18.87 | 45.8254 | 184.43 | 0.5904 |
| 1.87036 | 1.95 | 48.6845 | 19.10 | 0.3936 |
| 1.76780 | 4.41 | 51.7107 | 43.07 | 0.4920 |
| 1.66946 | 4.31 | 55.0050 | 42.14 | 0.1476 |
| 1.55494 | 23.26 | 59.4448 | 227.33 | 0.2952 |
| 1.52467 | 28.30 | 60.7477 | 276.50 | 0.2460 |
| 1.49768 | 3.66 | 61.9619 | 35.81 | 0.4920 |
| 1.44300 | 6.71 | 64.5876 | 65.60 | 0.3444 |
| 1.33605 | 4.10 | 70.4834 | 40.06 | 0.0984 |
| 1.29458 | 5.02 | 73.0979 | 49.06 | 0.5904 |
| 1.21861 | 2.73 | 78.4123 | 26.65 | 0.3600 |
Fig: 4

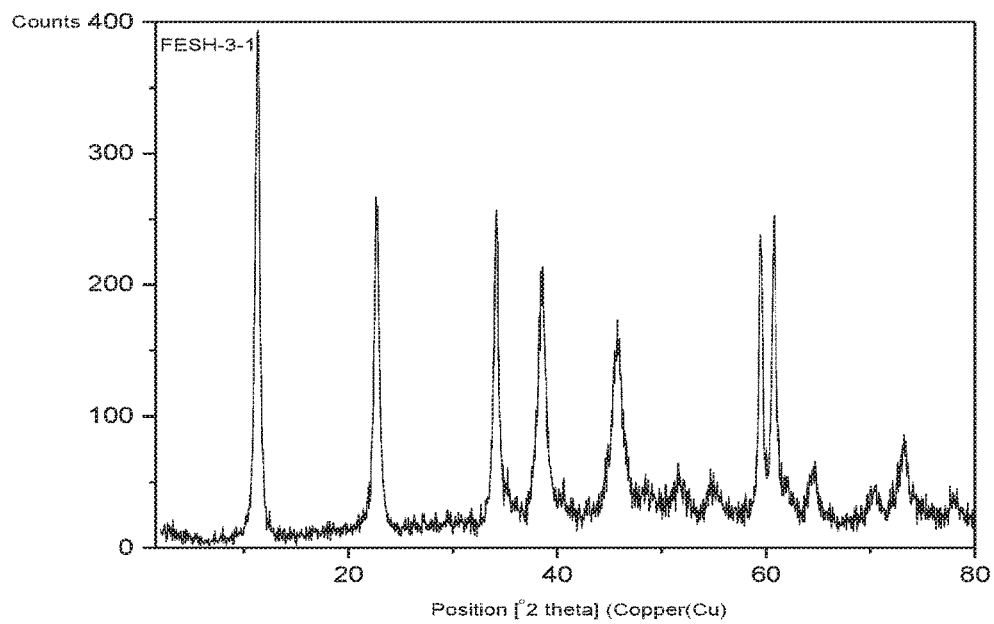
Peak List
| d-spacing [Å] | Rel. Int. [%] | Pos. [°2Th.] | Height [cps] | FWHM [°2Th.] |
|---|---|---|---|---|
| 7.75647 | 100.00 | 11.4084 | 372.67 | 0.3444 |
| 3.93103 | 65.81 | 22.6198 | 245.26 | 0.3936 |
| 2.61960 | 60.64 | 34.2307 | 225.99 | 0.2952 |
| 2.33568 | 43.88 | 38.5459 | 163.51 | 0.5904 |
| 1.97739 | 30.13 | 45.8935 | 112.30 | 0.7872 |
| 1.76594 | 4.66 | 51.7691 | 17.37 | 0.9840 |
| 1.55529 | 55.61 | 59.4300 | 207.23 | 0.3444 |
| 1.52371 | 57.08 | 60.7902 | 212.72 | 0.3936 |
| 1.44085 | 9.58 | 64.6958 | 35.69 | 0.7872 |
| 1.33609 | 5.59 | 70.4812 | 20.84 | 0.7872 |
| 1.29279 | 12.77 | 73.2156 | 47.61 | 0.4920 |
| 1.22426 | 3.31 | 77.9815 | 12.33 | 0.9600 |
Fig: 5

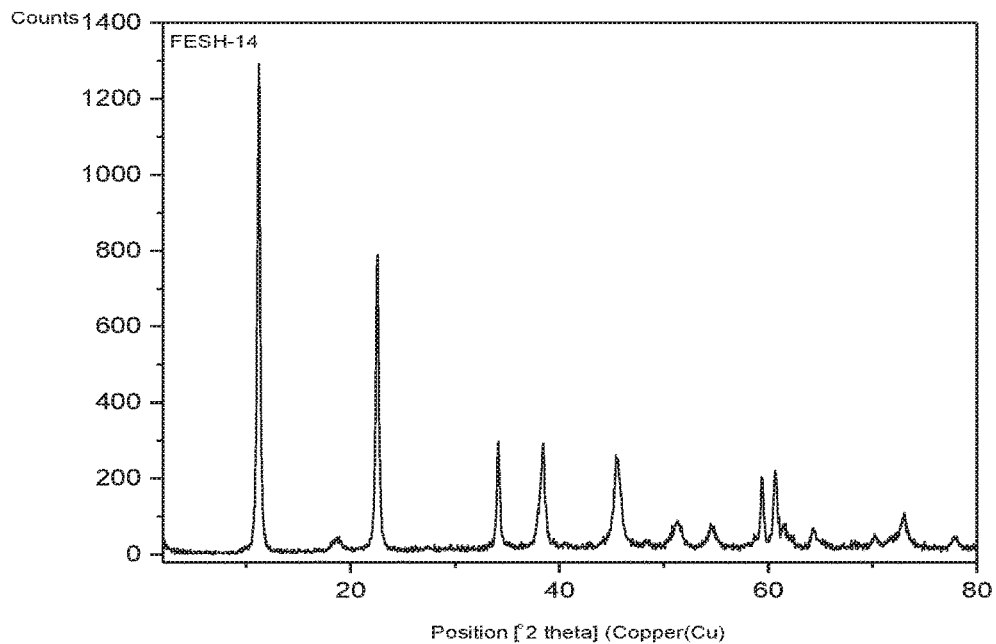
Peak List
| d-spacing[Å] | Rel.Int.[%] | Pos.[°2Th.] | Height[cps] | FWHM[°2Th.] |
|---|---|---|---|---|
| 7.87583 | 100.00 | 11.2350 | 1280.80 | 0.2460 |
| 4.74084 | 2.22 | 18.7175 | 28.43 | 0.7872 |
| 3.94444 | 60.27 | 22.5419 | 771.99 | 0.2952 |
| 2.62926 | 21.95 | 34.1010 | 281.11 | 0.2952 |
| 2.33934 | 20.73 | 38.4832 | 265.51 | 0.2952 |
| 1.99330 | 18.05 | 45.5066 | 231.13 | 0.6888 |
| 1.88434 | 0.99 | 48.3002 | 12.71 | 0.5904 |
| 1.78275 | 4.99 | 51.2452 | 63.97 | 0.2952 |
| 1.68119 | 3.85 | 54.5892 | 49.26 | 0.5904 |
| 1.55643 | 13.54 | 59.3821 | 173.37 | 0.2460 |
| 1.52737 | 13.82 | 60.6295 | 177.02 | 0.3444 |
| 1.44794 | 3.50 | 64.3404 | 44.80 | 0.3936 |
| 1.34002 | 2.22 | 70.2437 | 28.42 | 0.5904 |
| 1.29605 | 6.48 | 73.0017 | 82.99 | 0.4920 |
| 1.22505 | 1.90 | 77.9221 | 24.31 | 0.7200 |
Fig: 6

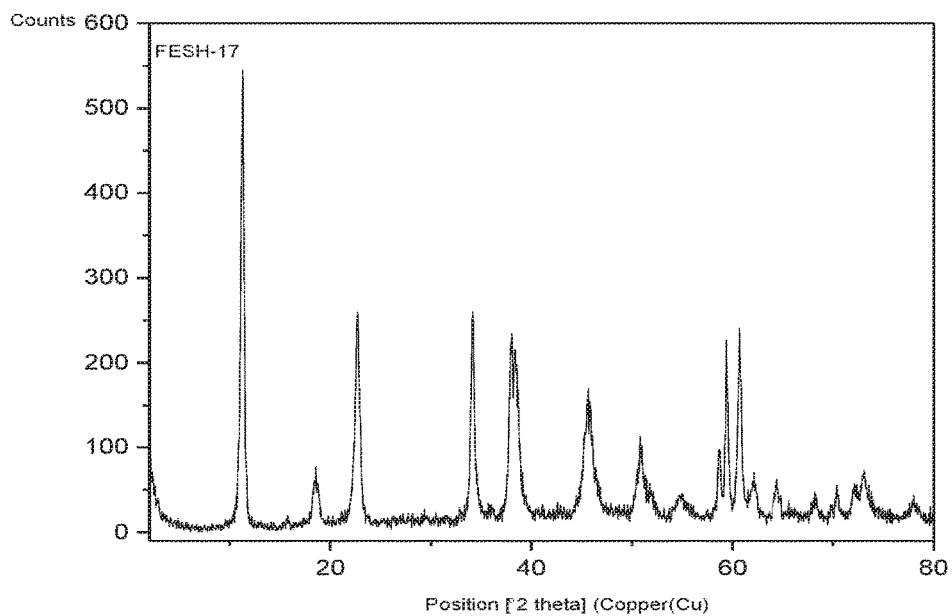
Peak List
| d-spacing[Å] | Rel.Int.[%] | Pos.[°2Th.] | Height[cps] | FWHM[°2Th.] |
|---|---|---|---|---|
| 7.81468 | 100.00 | 11.3231 | 537.15 | 0.2952 |
| 4.81388 | 8.47 | 18.4310 | 45.52 | 0.5904 |
| 3.91721 | 45.44 | 22.7007 | 244.07 | 0.2952 |
| 2.62703 | 44.79 | 34.1308 | 240.59 | 0.2952 |
| 2.36609 | 36.63 | 38.0314 | 196.76 | 0.2952 |
| 2.33621 | 31.11 | 38.5370 | 167.10 | 0.3936 |
| 1.98380 | 20.92 | 45.7369 | 112.37 | 0.7872 |
| 1.79431 | 13.66 | 50.8917 | 73.39 | 0.3936 |
| 1.67325 | 3.97 | 54.8701 | 21.30 | 0.5904 |
| 1.57251 | 14.85 | 58.7151 | 79.78 | 0.2460 |
| 1.55577 | 33.71 | 59.4101 | 181.07 | 0.2460 |
| 1.52626 | 41.69 | 60.6781 | 223.91 | 0.3936 |
| 1.49243 | 7.23 | 62.2041 | 38.81 | 0.5904 |
| 1.44797 | 6.17 | 64.3390 | 33.15 | 0.6888 |
| 1.37409 | 3.86 | 68.2572 | 20.74 | 0.4920 |
| 1.33731 | 5.68 | 70.4071 | 30.49 | 0.2952 |
| 1.31025 | 5.80 | 72.0857 | 31.13 | 0.3936 |
| 1.29524 | 8.74 | 73.0546 | 46.97 | 0.2952 |
| 1.22324 | 3.51 | 78.0589 | 18.86 | 0.9600 |
Fig: 7

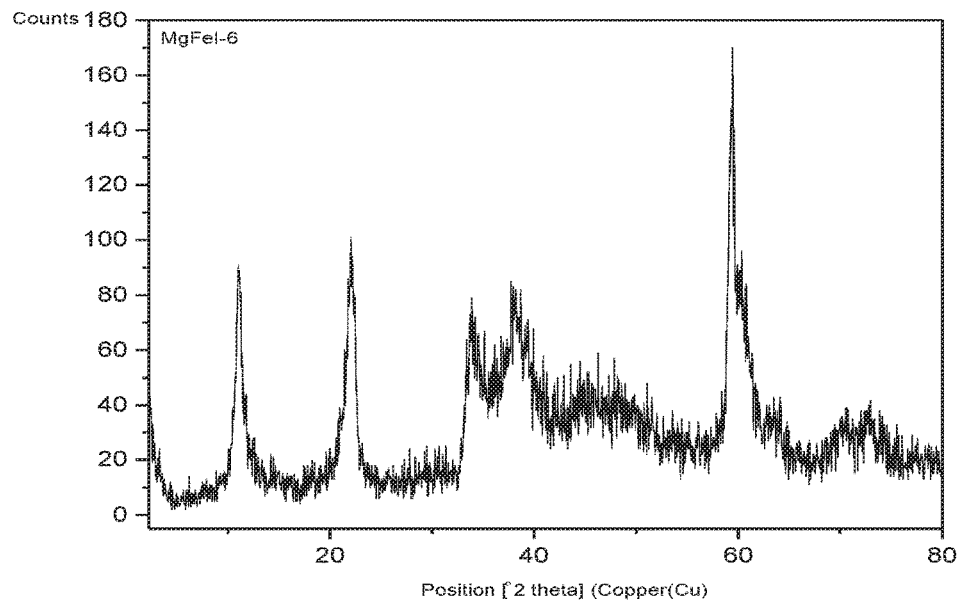
Peak List
| d-spacing [Å] | Rel. Int. [%] | Pos. [°2Th.] | Height [cps] | FWHM [°2Th.] |
|---|---|---|---|---|
| 7.97322 | 68.56 | 11.0973 | 71.26 | 0.3936 |
| 3.99734 | 61.44 | 22.2398 | 63.87 | 0.6888 |
| 2.66245 | 28.76 | 33.6631 | 29.89 | 0.9840 |
| 2.35459 | 27.12 | 38.2243 | 28.19 | 0.5904 |
| 1.55500 | 100.00 | 59.3884 | 103.95 | 0.6000 |
Fig: 8

DOUBLE FORTIFIED SALT COMPOSITION CONTAINING IRON AND IODINE AND PROCESS FOR THE PREPARATION THEREOF

This application is a U.S. National Phase of PCT PCT/IN/2013/000124, filed Mar. 4, 2013, which claims the priority of Indian Application No. 607/DEL/2012, filed Mar. 2, 2012. the disclosures of which are incorporated herein by reference.

FIELD OF THE INVENTION

The present invention relates to composition of double fortified salt (DFS) containing iron and iodine. Particularly, the invention relates to fortification of edible salt with iron and iodizing agents based on synthetic hydrotalcite. More particularly, the invention relates to DFS having high whiteness, long term stability and no adverse effect on the colour and taste of food preparations.

BACKGROUND OF THE INVENTION

Iodine is a very important trace element necessary in the biosynthesis of thyroid hormones. On the other hand, deficiency of iron leads to anemia. Deficiencies of iron and iodine severely affect more than a third of the world's population.

Recognizing that salt is consumed in similar amounts by rich and poor alike, salt is considered to be an excellent vehicle to deliver the body's requirement of iodine and iron.

Reference may be made to the first revision of IS 12981:1991 pertaining to iron fortified iodized salt (double fortified salt) food grade specification wherein it is indicated that the specified ranges of iodine and iron are 30 ppm (min) at manufacturer's level and 850-1100 ppm, respectively.

Reference may be made to the same IS 12981:1991 wherein it is stated that the colour of the salt may be white or pink or grey.

Reference may be made to the same IS 12981:1991 wherein no information is given of stability of iron and iodine in the product nor any justification as to why 1% sodium hexametaphosphate should be a mandatory specification in double fortified salt.

Reference may again be made to the same IS 12981:1991 wherein it is stated that the purity of the NaCl used must be >99% whereas it is well known that edible salt consumed by the masses can have purity anywhere in the range of 96-99%.

Reference may be made to an article by B. S. Narsinga Rao, available at www.unu.edu/unupress/food/8F15le/8F151F06.htm entitled "Fortification of salt with iron and iodine to control anemia and goiter: Development of new formula with good stability and bioavailability of iron and iodine" wherein the author has prepared double fortified salt by mixing thoroughly ferrous sulphate, potassium iodide or iodate and stabilizers such as sodium hexa meta phosphate to the optimized content of 1%, The iodine loss was measured from initial of 20 μg/gm to 12 μg/gm within storage of 3 months period when iodine was added as $KIO_3$. Thus the product appears to not have the requisite stability.

Reference may be made to a paper entitled "Micro encapsulation for iodine stability in salt fortified with ferrous fumarate and potassium iodide" by Diosady L. L. et. al., in Food Research International, 2002, Volume 35, Issue 7, pp 635-642 wherein potassium iodide or potassium iodate was encapsulated in modified starches, gelatin, sodium hexametaphosphate and purified sodium chloride by spray drying and fluidized bed drying to produce microcapsules containing 0.3 to 2% iodine. The encapsulation is to provide physical barrier to iodine compound and employs expensive and cumbersome method of spray drying. Moreover, the ferrous fumarate used has unpleasant brown color which mars the aesthetic appearance of double fortified salt so prepared.

Reference may be made to a paper entitled "Dual fortification of salt with iodine and micronized Ferric pyrophosphate: a randomized, double-blind, controlled trial "by M. B. Zimmermann et al in Am. J. Clin. Nutr 80,952-959, 2004, wherein they have used DFS containing iodine and micronized ferric pyrophosphate as an effective fortification strategy in rural Africa. The stability has been reported to be 6 months.

Reference may be made to a paper entitled "A study of storage and distribution of double fortified salts in Kenya" by L Diosady et al Journal of Food Engineering, Volume 76, Issue 4, October 2006, 547-556, wherein Twenty-one formulations of double fortified salts were prepared by either blending the different iron premixes with either iodated salt, or iodine premix and blank salt. All the microencapsulated double fortified salt formulations retained most of the ferrous iron and iodine during the three-month study period. However, the results showed that double fortified salt (DFS) prepared with ferrous fumarate as the source of iron was generally more stable than those prepared with the other iron premixes investigated under typical environmental conditions of the salt distribution networks in Kenya. For DFS with ferrous fumarate premix and potassium iodide premix, the average iodine and ferrous iron retention obtained were 92% and 90%, respectively, for the Coastal (Mombasa) Zone, while for the Highland (Nairobi) Zone the average iodine and iron retentions were 87% and 86%, respectively. However they obtained good stability of iodine and ferrous using KI and Ferrous fumarate for three month only.

Reference may be made to U.S. Pat. No. 699,814 by Nestec SA, wherein a ferric fortification system is used for iron fortification of food stuff and beverages. A complex is formed using ferric compound and caseinate for its application and found to be stable and bioavailable. There is no mention of its utility for formulation of double fortified salt.

Reference may be made to PCT publication WO 2009/074998 A2, wherein use of ferrous ammonium phosphate as iron fortifying agent with iodized salt to prepare double fortified salt is disclosed. The stability of iodine and iron is ascribed to chelating form of iron. The main drawback of the patent is that the stability of iodine was measured over a period of only sixty days. Moreover, use of ammonium containing ferrous compound is undesirable.

Reference may be made to U.S. Pat. No. 4,629,626, which discloses the preparation of hydrotalcite like structure wherein $Mg^{2+}$ in the conventional hydrotalcite structure is replaced with $Fe^{2+}$ ion. The main drawback of the invention is that the compound so prepared is greenish in color and gets converted into brown color on exposure to air.

Reference may be made to a paper entitled "Iron-Magnesium Hydroxycarbonate (Fermagate): A Novel Non-Calcium-Containing Phosphate Binder for the Treatment of Hyperphosphatemia in Chronic Hemodialysis Patients" by Christopher W. McIntyre et al in Clin J Am Soc Nephrol 4: 401-409, 2009, wherein it is disclosed that Fermagate (Ineos Healthcare, Warrington, United Kingdom) contains magnesium and ferric iron held in an insoluble hydrotalcite structure $[Mg_4Fe_2(OH)_{12}]^{2+}.CO_3^{2-}.mH_2O]$. The iron and magnesium are held in a tight crystalline-layered structure, with carbonate groups, which are exchanged for phosphate, lying between the layers. The product is indicated to be coloured.

Reference may be made to a paper entitled "A study of phosphate absorption by magnesium iron hydroxycarbonate" by Yi Du, Nicholas Rees and Dermot O'Hare, in *Dalton Trans.*, 2009, 8197-8202 wherein description is given for the synthesis of hydrotalcite structure containing iron and magnesium. The main drawback of this iron containing $Fe^{3+}$ is that it is made using nitrate salt that results in nitrate containing effluent and the obtained product was orange yellow in color.

Reference may be made to U.S. Pat. No. 7,695,707 dated 13 Apr. 2010, entitled "An improved iodized salt and a process for its preparation" by P. K. Ghosh et al assigned to CSIR, which discloses a method for preparation of iodizing agent for the use in the formulation of iodized salt that offers excellent stability of iodine in iodized salt.

Reference may be made to South African patent ZA200004598 (A) or its equivalent Indian Patent No. 193455 assigned to Unilever which discloses a food component, particularly iodine fortified sodium chloride and a process for obtaining iodine intercalated in the interlayer spaces of layered double hydroxide.

Reference may be made to US patent Application Publication No. US 2010/0203152, wherein use of Mg, Fe hydrotalcite like crystal structure has been described as antacid.

Reference may be made to the paper by S. Piomelli et al. (*Blood*, 1973, 41, 451) wherein it is reported that not only iron deficiency but deficiency of magnesium too can lead to anaemic conditions.

Reference may be made to the review paper entitled "Magnesium deficiency and diabetes mellitus" by Chetan P. Hans, in *Current Science*, Vol. 83, No. 12, 25 Dec. 2002, wherein the functional role of magnesium in the pathogenesis of diabetes is described and introduces a relatively new concept on the implication of magnesium deficiency in diabetic complications.

It would be evident from the prior art that iron, magnesium and iodine are all useful micronutrients for the body and there is no report of any product of the three together which has white colour and long stability.

OBJECTS OF THE INVENTION

The main object of the present invention is to provide stable and white composition of edible salt fortified with iron and iodine.

Another object of the present invention is to prepare synthetic hydrotalcite containing Fe and Mg which is white in colour unlike the products in the prior art.

Yet another object of the present invention is to utilize the above in conjunction with iodate-exchanged synthetic hydrotalcite as disclosed in the prior art maintaining high stability of both iron and iodine and without any adverse effect on whiteness.

Yet another object of the present invention is to incorporate iron and iodine into the same synthetic hydrotalcite to simplify the formulation and facilitate more even distribution without affecting stability and whiteness.

Yet another object of the present invention is to prepare DFS containing iron up to 1200 ppm and iodine up to 40 ppm with these formulations.

Yet another object of the present invention is to avoid use of stabilizers such as sodium hexametaphosphate employed in some of the prior art.

Yet another object of the present invention is to provide much needed magnesium as an additional nutrient such magnesium being built into the lattice of the synthetic hydrotalcite formulations.

Another object is to show that such DFS imparts no adverse effect (taste, odour, color generation) on food items prepared with such salt.

SUMMARY OF THE INVENTION

Accordingly, present invention provides a fortifying agent of general formula 1

$$[Mg_{4.3\pm0.4}Fe(III)(OH)_{10.6\pm0.8}]$$
$$[CO_3]_{0.486-0.5}(IO_3)_{0.00\pm0.002} \cdot yH_2O$$

wherein y=3
exhibiting magnetic moment in the range of 1.33 to 1.49 B.M and having 13-15% low spin Fe(III) (w/w) and 0.0-0.6% I (w/w) as iron and iodine source for fortification of edible salt.

In an embodiment of the present invention, representative compounds of general formula 1 comprising:

$$[Mg_{4.3\pm0.4}Fe(III)(OH)_{10.6\pm0.8}][CO_3]_{0.5} \cdot 3H_2O; \quad (1a)$$

$$[Mg_{4.3\pm0.4}Fe(III)(OH)_{10.6\pm0.8}]$$
$$(CO_3)_{0.486}(IO_3)_{0.016\pm0.002} \cdot yH_2O; \quad (1b).$$

In another embodiment of the present invention, compound of formula 1a is useful for iron fortification.

In yet another embodiment of the present invention, compound of formula 1b is useful as iron and iodine source for double fortification of edible salt.

In yet another embodiment, present invention provides a process for the preparation of fortifying agent comprising the steps of:

i. preparing a slurry by mixing aqueous $FeCl_3$ solution into aqueous $Na_2CO_3$ solution at temperature in the range of 25 to 35° C.;

ii. adding slurry as obtained in step (i) into aqueous $Mg(OH)_2$ slurry so as to have [Mg]:[Fe] ratio in the range of 3.5:4.75 to 3.5:4.8 at temperature in the range of 25 to 35° C.;

iii. adjusting the pH of the slurry as obtained in step (ii) with additional amounts of $Na_2CO_3$ as required to kept pH in the range of 9.0-10;

iv. charging into pressure reactor and subjecting to hydrothermal treatment at temperature in the range of 140 to 150° C. for period in the range of 4 to 5 h to attain the desired crystallinity followed by cooling at temperature in the range of 50 to 60° C., filtering and washing the white solid cake obtained to make it free of electrolyte and ensuring a pH of wash water <10;

v. drying the cake at temperature in the range of 105-115° C.;

vi. pulverizing the dry product and passing through −30+72 BSS mesh to obtain compound (1a);

vii. calcining the product obtained in step (v) at temperature in the range of 440-460° C. for period in the range of 1 to 2 h, cooling at temperature in the range of 50 to 60° C. and contacting with an appropriate volume of 1 mM aqueous $KIO_3$ solution (assuming 95% iodate uptake) under stirring for period in the range of 4 to 5 min, leaving to stand thereafter for period in the range of 12 to 16 hours followed by separating the solid and washing free of adhering iodate, drying at temperature in the range of 100 to 110° C. to obtain compound (1b).

In yet another embodiment of the present invention, [Mg]:[Fe] ratio is preferably in the range of 3.95 to 4.75.

In yet another embodiment of the present invention, pH of the slurry in step (iii) is adjusted preferably in the range of 9-9.5 to obtain desired whiteness of the final product.

In yet another embodiment of the present invention, other than conventional sources of magnesium salts or magnesium hydroxide, sea or sub-soil bittern too can be utilized as magnesium source after due refinement.

In yet another embodiment of the present invention, compound of formula 1a is useful as iron fortification of salt or in conjunction with iodate exchanged synthetic hydrotalcite (5-6% w/w iodine loading) of known prior art for preparation of double fortified salt with Fe and I contents as per requirement.

In yet another embodiment of the present invention, double fortified salt having 1000-1200 ppm Fe and 38-40 ppm I which is white in colour and stable for over 3 years of storage under ambient conditions and for which the loss of I is 5% in boiling water test.

In yet another embodiment of the present invention, compound of formula 1b is useful for preparation of double fortified salt having Fe and I contents of 1000-1200 ppm and 30-40 ppm as per requirement.

In yet another embodiment of the present invention, double fortified salt which is white in appearance and remains so even after 12 months of storage with negligible loss of iodine, and which even in the boiling water test showed only 5% loss of iodine.

In yet another embodiment of the present invention, both Fe and I would have greater uniformity of distribution in the salt since the required amount of iron and iodine per kg of salt is spread over 8 g of fortifying agent.

In yet another embodiment of the present invention, iron is spread over 8-9 g and the iodine is spread over only 0.5-0.6 g of fortification agent.

In yet another embodiment of the present invention, magnesium present in the matrix of the fortification agent is useful micronutrient.

In yet another embodiment of the present invention, fortification agents disintegrate spontaneously in 5-10 minutes in solution of 0.068 M HCl, such acidity normally prevailing in in the stomach.

In yet another embodiment of the present invention, no other additives such as sodium hexametaphosphate are necessary to impart stability and retain whiteness of the salt.

In yet another embodiment of the present invention, said agent is useful for applications other than fortification of edible salt also.

In an embodiment of the present invention pure magnesium salt or inexpensive sources of magnesium ion such as bittern may be used or magnesium hydroxide directly to dispense with steps (i) to (v).

In yet another embodiment of present invention, $Mg^{2+}$ concentration in the solution may range from 2-5% (w/v).

In yet another embodiment of the present invention, the alkali may be chosen from hydroxide of calcium, sodium or potassium.

In yet another embodiment of the present invention, the reaction of alkali with Mg containing solution is carried out at ambient temperature.

In yet another embodiment of the present invention, the alkali concentration ranges from 0.5-1N.

In yet another embodiment of the present invention, the magnesium hydroxide precursor so prepared is filtered by known methods and washed with water to remove soluble impurities.

In yet another embodiment of the present invention, the washing is continued till $Cl^-$ and $SO_4^{2-}$ impurity in wash water is 0.1% (w/v).

In yet another embodiment of the present invention Mg precursor is slurried into water to obtain solid content of 0.72%.

In yet another embodiment of the present invention, ferric salt can be chosen from inorganic salt of iron such as $FeCl_3$.

In yet another embodiment of the present invention, the $Fe^{3+}$ concentration of the iron salt solution is in the range of 2-3% (w/v).

In yet another embodiment of the present invention, the compositional cation molar ratio of $Mg^{2+}/Fe^{3+}$ in the reaction mixture is in the range of 3.95 to 4.75 to achieve the desired whiteness of the product.

In yet another embodiment of the present invention, the soda ash solution concentration may range from 0.2-0.5M.

In yet another embodiment of the present invention, Fe precursor is prepared by reacting the ferric salt solution and soda ash solution at ambient temperature under stirring.

In yet another embodiment of the present invention, the Mg precursor slurry and Fe precursor slurry are mixed under mechanical stirring.

In yet another embodiment of the present invention, the pH of the mixed slurry is adjusted in the range of 9.0-10 and more particularly 9-9.5 prior to hydrothermal treatment to obtain desired whiteness of the final product.

In yet another embodiment of the present invention, the mixed slurry of precursors is heated to 140-150° C. for 1-5 hours, in an autoclave under stirring to obtain desired crystallinity and whiteness, the precise control of temperature and time being governed by the scale of the experiment.

In yet another embodiment of the present invention, the hot slurry is cooled to 60° C.

In yet another embodiment of the present invention, the slurry is filtered using known methods.

In yet another embodiment of the present invention, the cake is washed with DM water till pH of the wash water is 9.5-10.

In yet another embodiment of the present invention, the wet cake is dried using dryer.

In yet another embodiment of the present invention, the dried product is pulverized to pass through −30+72 BSS mesh.

In yet another embodiment of the present invention, $SHT-IO_3$ is prepared using known method.

In yet another embodiment of the present invention the white Fe,Mg-hydrotalcite was used in combination with iodate-exchanged hydrotalcite for the purpose of double fortification of salt to required levels of Fe and I.

In yet another embodiment of the present invention, iodate was exchanged into the Fe,Mg-hydrotalcite itself at a level such that the single product sufficed for the purpose of achieving required levels of Fe and I in DFS.

In yet another embodiment of the present invention the common salt used was solar salt with mesh size in the range of −30+72 and having the composition $Na^+$—37-39%; $Cl^-$—58-60%, $Mg^{2+}$—0.02-0.05%, $Ca^{2+}$—0.02-0.30%, $SO_4^{2-}$—0.05-0.50%, Moisture—0.3-1.0%.

In another embodiment of the present invention the repose angle of the DFS prepared was in the range of 20-25°.

In yet another embodiment of the present invention, the DFS was prepared by mixing the Fe—SHT and $SHT-IO_3$ in the required proportion to get 30-40 ppm of iodine and 1000-1200 ppm of Fe.

In yet another embodiment of present invention, the DFS was prepared by mixing the Fe—SHT-IO$_3$ in the required proportion to get 30-40 ppm of iodine and 1000-1100 ppm of Fe$^{3+}$.

In another embodiment of the present invention the DFS prepared using both of the above products were white in colour and free of any odour.

In another embodiment of the present invention the stability of DFS prepared using Fe—SHT and Fe—IO$_3$ under storage at ambient condition showed excellent stability even after a period of 36 months whereas in the case of the product having Fe and I in the same matrix, was completed up to 12 months and it too showed excellent stability. Both products also gave only 5% iodine loss in boiling water test.

In yet another embodiment of the present invention Indian food preparations with the DFS showed perfectly agreeable taste and colour.

BRIEF DESCRIPTION OF THE DRAWINGS

FIG. 1 represents XRD pattern of the product as obtained in example 1.
FIG. 2 represents XRD pattern of the product as obtained in example 2.
FIG. 3 represents XRD pattern of the product as obtained in example 3.
FIG. 4 represents XRD pattern of the product as obtained in example 4.
FIG. 5 represents XRD pattern of the product as obtained in example 5.
FIG. 6 represents XRD pattern of the product as obtained in example 6.
FIG. 7 represents XRD pattern of the product as obtained in example 7.
FIG. 8 represents XRD pattern of the product as obtained in example 8.

DETAIL DESCRIPTION OF THE INVENTION

The present invention pertains to the development of white hydrotalcite type products which serve the purpose of iron fortification or iron and iodine double fortification of common salt. Precise control of a combination of process parameters during preparation of the materials together yield the beneficial effect of the white crystalline products exhibiting hydrotalcite-type powder XRD pattern, while containing high amounts of Fe(III) and even Fe(III) and IO$_3^-$ within the same matrix. The compounds thus prepared can be approximately represented as

[Mg$_{4.3\pm0.4}$Fe(III)(OH)$_{10.6\pm0.8}$][CO$_3$]$_{0.5}$·3H$_2$O exhibiting magnetic moment of 1.49 B.M., and having 13-15% low spin Fe(III) (w/w) and

[Mg$_{4.3\pm0.4}$Fe(III)(OH)$_{10.6\pm0.8}$](CO$_3$)$_{0.486}$(IO$_3$)$_{0.016\pm0.002}$·yH$_2$O exhibiting magnetic moment of 1.339 B.M., and having 13-15% low spin Fe(III) (w/w) and 0.4-0.6% (w/w) iodine.

The compounds so prepared are white in colour, exhibit excellent stability towards retention of both iron and iodine, and dissolve completely in acidic condition of pH 2-3 that prevails in the stomach. Where [Mg$_{4.3\pm0.4}$Fe(III)(OH)$_{10.6\pm0.8}$][CO$_3$]$_{0.5}$·3H$_2$O is used for iron fortification, iodate-exchanged synthetic hydrotalcite as disclosed in the prior art was co-mixed with the above to supply iodine. Where [Mg$_{4.3\pm0.4}$Fe(III)(OH)$_{10.6\pm0.8}$](CO$_3$)$_{0.486}$(IO$_3$)$_{0.016\pm0.002}$·yH$_2$O is used, ca. 8 g of the product added into 1 kg of salt gives 1000-1200 ppm Fe and 30-40 ppm I uniformly distributed throughout the salt.

SHT containing IO$_3^-$ is prepared following the method of U.S. Pat. No. 7,695,707 dated 13 Apr. 2010. SHT-Fe and SHT-IO$_3$ are mixed in the required proportion in edible salt to contain about 1000 ppm of Fe and 30 ppm of iodine.

The iodine content in DFS is analyzed by procedure given in Indian J Med Res 123, April 2006, pp 531-540 with slightly modifications i.e. 1 ml of 5% KI was added to 10 g sample and to it 50 ml of 0.2 M H$_3$PO$_4$ was added and liberated iodine was tritrated with 0.005 N sodium thio sulphate. Iron content of DFS was measured by spectrophotometric method using o-phenanthroline i.e. 2.5 g DFS was dissolved in 100 ml 0.2 N HCl and 5 ml of the filtrate was used with hydroxyl ammonium chloride (HAC). Iron in DFS was also checked using ICP-OES instrument. 2.5 gm of DFS was dissolved in 100 ml 0.2 N HCl and 25 ml of this solution was diluted to 400 ml. This solution was analyzed with ICP-OES instrument shown 1.582 ppm of iron. (i.e. 1012 ppm of total iron in DFS). Magnetic moment data were recorded at the Indian Association for the Cultivation of Science, Jadavpur.

The present invention is directed to provide a process for the preparation of double fortified salt (DFS) that exhibits greater stability for iron in form of low spin Fe$^{3+}$ and iodine in form of IO$_3^-$ as fortifying agents. Accordingly the present invention outlines the process of preparation of DFS comprising the following steps: (i) Taking Mg$^{2+}$ containing salt or bittern, (ii) diluting to required level, (iii) clarifying the solution, (iv) adding into it sodium hydroxide solution in two stages, i.e., a small amount in the first stage for precipitation of unwanted hydroxides which are then removed and thereafter, adding more sodium hydroxide to obtain a pure form of magnesium hydroxide, (v) Filtering the slurry of magnesium precursor and washing with water (vi) Slurrying the Mg precursor into DM water (vii) Preparing the solution of Fe$^{3+}$ salt in water, (vii) Adding it into soda ash solution, (ix) mixing the Fe precursor so prepared into Mg precursor slurry prepared in step (vi) above, (x) Allowing the solids in mixed slurry to settle, (xi) removing the supernatant solution, (xii) adding the solution of soda ash into the decanted solids, (xiii) heating the slurry prepared in step (xii) in an autoclave upto 150° C. for 1-5 hours, (xiv) Cooling the slurry, (xv) filtering the slurry, (xvi) washing the cake, (xvii) drying the cake, (xviii) pulverizing the dried solids, (xix) sieving the product, (xx) using the product as is along with SHT-iodate to formulate double fortified salt, (xxi) optionally, calcining the product obtained in (xix) above and contacting with an aqueous solution of potassium iodate to incorporate 0.4-0.6% iodine (w/w) so as to provide iron and iodine in the same matix, (xxii) formulating double fortified salts using the compositions of (xx) and (xxi) above such that the final salt thus prepared contains up to 1200 ppm of iron and up to 40 ppm of iodine.

Inventive Steps

The main inventive steps are:
i. Discovering that by control of the Mg$^{2+}$:Fe$^{3+}$ ratio and the pH during crystallization of Fe, Mg-hydrotalcite, a white Fe$^{3+}$-exchanged SHT-carbonate can be obtained which, in combination with iodate-exchanged synthetic hydrotalcite as disclosed in the prior art, would give a double fortification agent that is also white in colour.
ii. Recognizing that it is feasible to incorporate iodate within the Fe, Mg-hydrotalcite matrix itself and thereafter computing the amount that would be required so that the same matrix delivers Fe and I in the required proportions when mixed into edible salt.

iii. Discovering that such iodate incorporation into Fe, Mg-hydrotalcite alters the crystallinity of the sample but without adverse effect on whiteness and stability of the product under use.
iv. Recognising further that incorporation of both micronutrients in the same matrix makes it much easier to ensure uniform distribution of these micronutrients in the salt, particularly iodine which otherwise would be more difficult to distribute uniformly.
v. Thereafter demonstrating excellent stability of the resultant salts on long storage and also through boiling water test.
vi. Recognising that $Mg^{2+}$ too is an important micronutrient which can be provided by the above composition.
vii. Dispensing with undesirable additives such as sodium hexametaphosphate used in some commercial formulations of DFS.

The following examples are given by way of illustration and therefore should not be construed to limit the scope of the invention.

EXAMPLE 1

700 ml of 0.9N sodium hydroxide solution was added over 45 minutes under stirring into 100 ml of 0.374 M $MgCl_2$ solution (7.6 gm $Mg^{2+}$) and further stirred for 15 minutes at ambient temperature.

The slurry was filtered using single filtration unit and the cake was washed with water till $Cl^-$ content of filtrate reached a value of around 0.1% (w/v). Wet cake of $Mg(OH)_2$ was well dispersed in demineralised water and made up to 1000 ml slurry (hereinafter also referred to as Mg precursor).

200 ml $FeCl_3$ solution containing 2.83% $Fe^{3+}$ (w/v) (0.101 mol) was added over 30 minutes into 660 ml of 0.28 M sodium carbonate (0.185 mol) at ambient temperature. It was further stirred for 15 minutes at ambient temperature to obtain a slurry (hereinafter referred to as $Fe^{3+}$ precursor).

Slurry of $Fe^{3+}$ precursor so prepared was added into slurry of magnesium precursor in 20 minutes at ambient temperature and the resultant slurry was kept for settling for 1 hour. 800 ml of supernatant was decanted and 800 ml of solution containing 5 gm of sodium carbonate prepared in DM water was added and maintained pH of the slurry at 9. The slurry having [Mg]:[Fe] mole ratio of 3.14 was then charged in an autoclave and heated up to 145° C. and corresponding pressure. The slurry was subjected to this condition for 1 hr. The slurry was allowed to cool down to 60° C. and product was then filtered and washed till free from adhering electrolytes. The end of washing was indicated by measurement of pH of the wash water to be <10. The cake was dried in dryer at 110° C. 25 gm of product was obtained which was pulverized to pass through −30+72 BSS mesh. The product was characterized by XRD, IR and particle size distribution. XRD pattern exhibited all the six major diffraction bands of hydrotalcite like material, specifically bands at 7.92, 3.95, 2.62, 2.34, 1.55 and 1.52 Å (FIG. 1). The product was, however, unacceptable as it had a brown red colour.

EXAMPLE 2

3150 ml of 0.9N sodium hydroxide solution was added over 45 minutes under stirring to 1950 ml clarified bittern prepared in Example 4 containing 37.4 gm of magnesium ions (1.558 mol) with continuous stirring at ambient temperature.

The slurry is filtered using single filtration unit and the cake is washed with water till content of filtrate reached a value of around 0.1% (w/v). Wet cake of magnesium precursor was well dispersed in demineralised water and made up to 5000 ml slurry.

760 ml $FeCl_3$ solution containing 2.83% $Fe^{3+}$ (w/v) (0.304 mol) was added over 30 minutes into 2500 ml solution of 0.28 M sodium carbonate (0.7 mol) at ambient temperature. It was further stirred for 15 minutes at ambient temperature to obtain a slurry.

Slurry of $Fe^{3+}$ precursor so prepared was added to slurry of magnesium precursor in 20 minutes at ambient temperature and mixed slurry was kept for 1 hour. 3000 ml of supernatant liquid was decanted and solution containing 40 gm of sodium carbonate prepared in DM water was added and maintained pH of the slurry at 11.5. The slurry having [Mg]:[Fe] mole ratio of 4.11 was then charged in a pressure reactor and heated up to 145° C. and corresponding pressure. The slurry was subjected to this condition for 2 hr. The slurry was allowed to cool down to 60° C. and product was then filtered and washed till free from adhering electrolytes. The end of washing was indicated by measurement of pH of the wash water to be <10. The cake was dried in dryer at 110° C. 125 gm of product was obtained which was pulverized to pass through −30+72 BSS mesh. The product was characterized by XRD, IR and particle size. XRD pattern exhibited all the six major diffraction bands at around 7.84, 3.92, 2.62, 2.34, 1.55 and 1.45 Å (FIG. 2) The diffraction pattern is shown in FIG. 2. The product was, however, unacceptable as it had a brown red colour.

EXAMPLE 3

350 ml of 0.9N sodium hydroxide solution was added over 45 minutes under stirring into 50 ml of 0.354 M $MgCl_2$ solution (3.6 gm $Mg^{2+}$) and further stirred for 15 minutes at ambient temperature.

The slurry was filtered using single filtration unit and the cake was washed with water till $Cl^-$ content of filtrate reached a value of around 0.1% (w/v). Wet cake of $Mg(OH)_2$ was well dispersed in demineralised water and made up to 500 ml slurry.

75 ml $FeCl_3$ solution containing 2.83% $Fe^{3+}$ (w/v) (0.038 mol) was added over 30 minutes into 250 ml solution of 0.28 M sodium carbonate (0.07 mol) at ambient temperature. It was further stirred for 15 minutes at ambient temperature to obtain a slurry.

Slurry of $Fe^{3+}$ precursor so prepared was added into slurry of magnesium precursor in 20 minutes at ambient temperature and the resultant slurry was kept for settling for 1 hour. 350 ml of supernatant was decanted and 350 ml of solution containing 2 gm of sodium carbonate prepared in DM water was added and maintained pH of the slurry at 9. The slurry having [Mg]:[Fe] mole ratio of 3.95 was then charged in an autoclave and heated up to 145° C. and corresponding pressure. The slurry was subjected to this condition for 2 hr. The slurry was allowed to cool down to 60° C. and product was then filtered and washed till free from adhering electrolytes. The end of washing was indicated by measurement of pH of the wash water to be ≤10. The cake was dried in dryer at 110° C. 13.5 gm of product was obtained which was pulverized to pass through −30+72 BSS mesh. The product was characterized by XRD, IR and particle size distribution. XRD pattern exhibited all the six major diffraction bands of hydrotalcite like material, specifically bands at 7.83, 3.92, 2.62, 2.33, 1.55 and 1.50 Å. (FIG. 3). Although in all the Examples 1-3 a hydrotalcite-like material was obtained, the product in the present example was white in colour unlike the red brown colour of the products obtained in Examples 1 and 2.

Examples 1-3 teach us the critical importance of the [Mg]:[Fe] mole ratio and pH of slurry taken for hydrothermal treatment for the objective of obtaining a white product.

EXAMPLE 4

Bittern with a density of 29° Be containing 20% NaCl, 8.4% $MgCl_2$, 5.4% $MgSO_4$ and 1.8% KCl (w/v) was diluted with water to get magnesium ions concentration of about 2% (w/v). The diluted bittern was then treated with a solution of non-ferric aluminium sulphate containing 1.02% (w/v) $Al_2O_3$ and a solution of 1N caustic soda to precipitate 100 ppm aluminium hydroxide and 300 ppm of magnesium hydroxide. These precipitates were removed by settling to refine the bittern. The clarified bittern containing 1.92% (w/v) magnesium ions was obtained.

350 ml of 0.9N sodium hydroxide solution was added over 45 minutes under stirring to 190 ml clarified bittern containing 3.6 gm of magnesium ions (0.15 mol) with continuous stirring at ambient temperature.

The slurry is filtered using single filtration unit and the cake is washed with water till $Cl^-$ and $SO_4^{2-}$ content of filtrate reached a value of around 0.1% (w/v). Wet cake of magnesium precursor was well dispersed in demineralised water and made up to 500 ml slurry.

75 ml $FeCl_3$ solution containing 2.83% $Fe^{3+}$ (w/v) (0.038 mol) was added over 30 minutes into 250 ml solution of 0.28 M sodium carbonate (0.07 mol) at ambient temperature. It was further stirred for 15 minutes at ambient temperature to obtain slurry.

Slurry of $Fe^{3+}$ precursor so prepared was added into slurry of magnesium precursor in 20 minutes at ambient temperature and the resultant slurry was kept for settling for 1 hour. 350 ml of supernatant was decanted and 350 ml of solution containing 2 gm of sodium carbonate prepared in DM water was added and maintained pH of the slurry at 9.0. The slurry having [Mg]:[Fe] mole ratio of 3.95 was then charged in an autoclave and heated up to 150° C. and corresponding pressure. The slurry was subjected to this condition for 2 hr. The slurry was allowed to cool down to 60° C. and product was then filtered and washed till free from adhering electrolytes. The end of washing was indicated by measurement of pH of the wash water to be ≤10. The cake was dried in dryer at 110° C. 11 gm of product was obtained which was pulverized to pass through −30+72 BSS mesh. The product was characterized by XRD, IR and particle size distribution. XRD pattern exhibited all the six major diffraction bands of hydrotalcite like material, specifically bands at 7.77, 3.89, 2.62, 2.33, 1.55 and 1.49 Å. (FIG. 4). The product obtained in the present example was white in colour as in Example 3.

This example teaches the use of an inexpensive source of magnesium chloride, namely bittern.

EXAMPLE 5

3500 ml of 0.9N sodium hydroxide solution was added over 45 minutes under stirring to 1950 ml clarified bittern containing 37.5 gm of magnesium ions (1.562 mol) with continuous stirring at ambient temperature.

The slurry is filtered using single filtration unit and the cake is washed with water till $Cl^-$ and $SO_4^{2-}$ content of filtrate reached a value of around 0.1% (w/v). Wet cake of magnesium precursor was well dispersed in demineralised water and made up to 5000 ml slurry.

760 ml $FeCl_3$ solution containing 2.83% $Fe^{3+}$ (w/v) (0.384 mol) was added over 30 minutes into 2500 ml solution of 0.28 M sodium carbonate (0.7 mol) at ambient temperature. It was further stirred for 15 minutes at ambient temperature to obtain a slurry.

Slurry of $Fe^{3+}$ precursor so prepared was added to slurry of magnesium precursor in 20 minutes at ambient temperature and mixed slurry was kept for 1 hour. 3000 ml of supernatant liquid was decanted and solution containing 20 gm of sodium carbonate prepared in DM water was added and maintained pH of the slurry at 9.5. The slurry having [Mg]:[Fe] mole ratio of 4.05 was then charged in a pressure reactor and heated up to 145° C. and corresponding pressure. The slurry was subjected to this condition for 1 hr. The slurry was allowed to cool down to 60° C. and product was then filtered and washed till free from adhering electrolytes. The end of washing was indicated by measurement of pH of the wash water to be ≤10. The cake was dried in dryer at 110° C. 135 gm of product was obtained which was pulverized to pass through −30+72 BSS mesh. The product was characterized by XRD, IR and particle size. XRD pattern exhibited all the six major diffraction bands at around 7.75, 3.93, 2.61, 2.33, 1.55 and 1.52 Å. (FIG. 5) The product obtained in the present example was white in colour.

This example teaches scale up of the process of Example 4 by a factor of ca. 12.

EXAMPLE 6

Carnallite end bittern with a density of 35° Be having 11.2% $Mg^{2+}$, 0.15% $K^+$, 0.27% $Na^+$, 0.31% $SO_4^{2-}$, 0.26% $Ca^{2+}$, 32.28% (w/v) was diluted with water to get magnesium ions concentration of about 2.24% (w/v). The diluted bittern was then treated with a solution of non-ferric aluminium sulphate containing 1.02% (w/v) $Al_2O_3$ and a solution of 1N caustic soda to precipitate 100 ppm aluminium hydroxide and 300 ppm of magnesium hydroxide. These precipitates were removed by settling.

The clarified bittern containing 2.2% (w/v) magnesium ions is obtained.

63 L of 1.0 N sodium hydroxide solution was added over 45 minutes under stirring to 34 L clarified bittern prepared as above containing 748 gm of magnesium ions (31.17 mol) with continuous stirring at ambient temperature.

The slurry is filtered using single filtration unit and the cake is washed with water till $Cl^-$ content of filtrate reached a value of around 0.1% (w/v). Wet cake of magnesium precursor was well dispersed in demineralized water using colloidal mill to prepare 90 L slurry containing magnesium ions.

13 L $FeCl_3$ solution containing 2.83% $Fe^{3+}$ (w/v) (6.57 mol) was added over 30 minutes into 44 L solution of 0.28 M sodium carbonate (12.32 mol) at ambient temperature. It was further stirred for 15 minutes at ambient temperature to obtain a slurry.

Slurry of $Fe^{3+}$ precursor so prepared was added to slurry of magnesium precursor in 20 minutes at ambient temperature and mixed slurry was kept for settling for 1 hour. 50 L of supernatant liquid was decanted and solution containing 350 gm of sodium carbonate prepared in DM water was added and maintained pH of the slurry at 10. The slurry having [Mg]:[Fe] mole ratio of 4.74 was then charged in a pressure reactor and heated up to 145° C. and corresponding pressure. The slurry was subjected to this condition for 5 hr. The slurry was allowed to cool down to 60° C. and product was then filtered and washed till free from adhering electrolytes. The end of washing was indicated by measurement of pH of the wash water to be ≤10. The cake was dried in dryer at 110° C. 2.4 kg of product was obtained which was pulverized to pass through −30+72 BSS mesh. The product was characterized by XRD, IR and particle size. XRD pattern exhibited all the six major diffraction bands at around 7.87, 3.94, 2.62, 2.33, 1.55 and 1.52 Å. (FIG. 6) The product obtained in the present example was white in colour This example teaches the further scale up of the process taught in Examples 4 and 5 to kilogram scale.

Thermo-gravimetric analysis of the product of the present example revealed that the loss on heating was ca. 11-12% up to 200° C. which is ascribed to loss of bound moisture while in the range of 200-400° C. the loss in weight was ca. 21% which is ascribed to decomposition of carbonate with concomitant release of $CO_2$.

Based on the above data and the absolute Mg and Fe contents in the products as obtained in Examples 3-6, the chemical formula of the white products obtained may be written as $[Mg_{4.3\pm0.4}Fe(III)(OH)_{10.6\pm0.8}][CO_3]_{0.5}0.3H_2O$. Further, the magnetic moment of the product of Example 6 was found to be 1.49 suggesting that Fe is present in the product as low spin Fe(III).

EXAMPLE 7

DFS was prepared using iodizing agent and iron fortifying agent prepared in Example 6 above. 3.1 gm of iodizing agent SHT-$IO_3$ (6% $I_2$) (prepared by the process of U.S. Pat. No. 7,695,707) and 44 gm iron fortifying agent (13% Fe w/w) were added to 5 kg NaCl having purity >99%. The DFS prepared was stored in plastic jar with lid. The salt was analyzed for iodine and iron content periodically.

Following table indicate the result of analysis.

| No. of Days | Iodine, ppm | Iron, ppm |
|---|---|---|
| 0 | 38.3 | 1076 |
| 30 | 38.5 | |
| 70 | 38.3 | |
| 100 | 38.2 | 1053 |
| 130 | 38.1 | |
| 156 | 38.6 | |
| 174 | 38.4 | 1286 |
| 369 | 39.5 | |
| 811 | 40.2 | 1153 |
| 1100 | 38.5 | |

EXAMPLE 8

Double Fortified salt prepared in Example-7 was measured for its whiteness index using Digital Reflectance meter made by Photo Electric Instruments Pvt Ltd, Rajasthan with respect to whiteness of magnesium carbonate taken as 100% whiteness. The following table indicates whiteness index of DFS along with those of common salt used for preparation of DFS designated as Solar Salt, one of the branded iodized salts available in Indian market designated as BR.-Salt.

| Designation of salt | Whiteness index |
|---|---|
| DFS | 95 |
| Branded salt | 97 |

EXAMPLE 9

6 gm of Mg Fe hydrotalcite as prepared in Example-6 above and exhibiting XRD pattern having intensity peaks (A°) 7.81, 3.91, 2.62, 2.36, 1.55, shown FIG. 7 and sharp IR absorption peak of interlayer carbonate ions at 1380 $cm^{-1}$, was powdered to pass through 60 BSS mesh and calcined in a furnace at 450° C. for two hour. The calcined hydrotalcite was cooled to 70° C. This was added to 300 ml of 0.001M potassium iodate solution prepared in distilled water. The reacting mass was stirred for five minutes maintaining the said temperature and left to stand for 16 hours with. The resultant slurry was filtered. The solid separated was washed with distilled water till the wash filtrate does not show any silver iodate precipitate with silver nitrate. The solids were dried at 110° C. The product off white in colour was characterized by XRD, IR and particle size. The product was characterized by XRD, IR and particle size. XRD pattern exhibited major diffraction bands at around 7.97, 3.99, 2.66, 2.35, 1.55 Å°. The compound was found to have peak characteristic of hydrotalcite like material and indicated absence of crystalline impurities. The diffraction pattern is shown in FIG. 8. Similarly absence of amorphous impurities was indicated by IR spectrum. The dry off white material was analyzed for its iodine content using classical method of iodometry employing sodium thiosulphate as titrant and found to contain 0.5% of iodine in it. The iron content of the product was analyzed with ICP-OES instrument shown 13.5% (w/w) of iron. The composite filtrate was analysed for its potassium iodate content and found to contain 7.69 mg of potassium iodate. The $K^+$ content of the composite filtrate analysed by flame photometer was found to be 11 mg.

The present example teaches that the $Fe^{3+}$ and $IO_3^-$ can co-exist in the same hydrotalcite matrix while still imparting satisfactory whiteness. Based on the analytical data of constituents, the chemical formula of the nearly white product obtained may be written as $[Mg_{4.3\pm0.4}Fe(III)(OH)_{10.6\pm0.8}](CO_3)_{0.486}(IO_3)_{0.016\pm0.002}\cdot yH_2O$.

EXAMPLE 10

DFS was prepared using iodizing agent and iron fortifying agent prepared in Example 9 above. 8.0 gm of iron and iodizing agent having 0.5% (w/w) iodine and 13.5% (w/w) iron was mixed thoroughly and uniformly with 1 kg of solar salt, which is ground and sieved to obtain fraction of −32+72 BSS mesh. The DFS prepared was stored in plastic jar with lid. The salt was analyzed for iodine and iron content. One of the best brand iodized salt was obtained from the market and used as control salt sample, which was analyzed for its iodine content and found to contain 37 ppm of iodine. Iodine loss was determined after boiling 5% w/v solution of both the samples for 15 minutes. The salt containing iodine and iron in the form of hydrotalcite equivalent to 40 ppm of iodine retained all the iodine without any loss. The loss iodine was 13.5% in a similar test with a branded salt containing 37 ppm of iodine, initially.

This example teaches that even when Fe and I are intercalated in the same matrix, a white salt having excellent stability of Fe and I can be achieved as judged by the boiling water test.

Advantages of the Invention

Reaction is carried out at both gram scale and kilogram scale and similar products were obtained indicating that the process is readily scalable.

We claim:

1. A fortifying agent, for edible salt wherein the fortifying agent is of compound of formula (1a) or formula (1b):

$$[Mg_{4.3\pm0.4}Fe(III)(OH)_{10.6\pm0.8}][CO_3]_{0.5}\cdot 3H_2O \qquad (1a),$$

or $$[Mg_{4.3\pm0.4}Fe(III)(OH)_{10.6\pm0.8}](CO_3)_{0.486}(IO_3)_{0.016\pm0.002}\cdot 3H_2O \qquad (1b)$$

wherein the compound of formula (1a) has a magnetic moment of 1.49 B.M., and 13-15% low spin Fe(III) (w/w); and the compound of formula (1b) has a magnetic moment of 1.339 B.M., 13-15% low spin Fe(III) (w/w) and 0.4-0.6% (w/w) I.

2. A process for preparing the fortifying agent as claimed in claim 1 comprising the steps of:
   (i) preparing a slurry by mixing aqueous $FeCl_3$ solution into aqueous $Na_2CO_3$ solution at a temperature of 25 to 35° C.;
   (ii) adding the slurry obtained in step (i) into an aqueous $Mg(OH)_2$ slurry to obtain a [Mg]:[Fe]ratio of 3.95 to 4.75 at a temperature of 25 to 35° C.;
   (iii) adjusting a pH of the slurry obtained in step (ii) with additional amounts of $Na_2CO_3$ to keep the pH of 9.0-10 to give a pH-adjusted slurry;
   (iv) charging the pH-adjusted slurry from step (iii) into a pressure reactor for hydrothermal treatment at a temperature of 140 to 150° C. for a period of 4 to 5 hours followed by cooling at a temperature of 50 to 60° C., filtering and washing a white solid cake obtained with water to remove electrolytes to give it washed white solid cake, and ensuring a pH of wash water <10;
   (v) drying the washed white solid cake obtained in step (iv) at a temperature of 105-115°C. to form a dry product; and
   (vi-a) pulverizing the dry product from step (v) to give a pulverized product, and passing the pulverized product through −30 to +72 BSS mesh to obtain the compound of formula (1a)

$$[Mg_{4.3\pm0.4}Fe(III)(OH)_{10.6\pm0.8}][CO_3]_{0.5}\cdot 3H2O \qquad (1a); or$$

(vi-b) calcining the dry product obtained in step (v) at a temperature of 440-460° C. for a period of 1 to 2 hr, cooling at temperature of 50 to 60° C. and contacting with 1 mM aqueous $KIO_3$ solution under stirring for a period of 4 to 5 min, leaving to stand thereafter for a period of 12 to 16 hours followed by separating a solid and washing the solid free of adhering iodate, drying at a temperature of 100 to 110° C. to obtain the compound of formula (1b)

$$[Mg_{4.3\pm0.4}Fe(III)(OH)_{106\pm0.8}](CO_3)_{0.486}(IO_3)_{0.016\pm0.002}\cdot 3H_2O \qquad (1b).$$

3. The process as claimed in claim 2, wherein the pH of the slurry in step (iii) is adjusted to 9.0-9.5.

4. The process as claimed in claim 2, wherein sea or sub-soil bittern is utilized as a magnesium source.

5. An iron fortified salt, fortified with the compound of formula (1a) of claim 1.

6. A double fortified salt, fortified with the compound of formula (1b) of claim 1, having an Fe content of 1000-1200 ppm and an I content of 30-40 ppm.

7. The double fortified salt of claim 6, which is white in appearance and remains so after 12 months of storage with negligible loss of iodine.

8. The double fortified salt of claim 6, wherein both Fe and I have a uniformity of distribution in the double fortified salt wherein an amount of iron and iodine in a kg of the double fortified salt is spread over 8 g of the fortifying agent.

9. The fortifying agent as claimed in claim 1, wherein the fortifying agent disintegrates spontaneously in 5-10 minutes in a solution of 0.068M HCl.

10. A double fortified sat, fortified with the compound of formula (1a) of claim 1 and iodate exchanged synthetic hydrotalcite with 5-6% w/w iodine loading.

11. The double fortified salt of claim 10, which has 1000-1200 ppm Fe and 38-40 ppm I, and is white in colour.

12. The double fortified salt of claim 10, wherein the iron is spread over 8-9 g and the iodine is spread over 0.5-0.6 g of the fortifying, agent.

* * * * *